(12) United States Patent
Uehara

(10) Patent No.: US 7,295,328 B2
(45) Date of Patent: Nov. 13, 2007

(54) METHOD OF AND APPARATUS FOR DETERMINING TIRE SHAPES

(75) Inventor: Tsuyoshi Uehara, Hiratsuka (JP)

(73) Assignee: The Yokohama Rubber Co. Ltd., Tokyo (JP)

(*) Notice: Subject to any disclaimer, the term of this patent is extended or adjusted under 35 U.S.C. 154(b) by 404 days.

(21) Appl. No.: 10/931,965

(22) Filed: Sep. 2, 2004

(65) Prior Publication Data

US 2005/0057758 A1    Mar. 17, 2005

(30) Foreign Application Priority Data

Sep. 3, 2003  (JP) .............................. 2003-311612

(51) Int. Cl.
*G01B 11/24* (2006.01)
(52) U.S. Cl. ..................................... 356/601
(58) Field of Classification Search ................ 356/601, 356/237.1; 73/146
See application file for complete search history.

(56) References Cited

U.S. PATENT DOCUMENTS 3,918,816 A * 11/1975 Foster et al. ................ 356/602

5,987,978 A * 11/1999 Whitehead .................... 73/146
2002/0011103 A1* 1/2002 Kimbara et al. ............... 73/146
2005/0058333 A1* 3/2005 Kaneko et al. ............. 382/141

FOREIGN PATENT DOCUMENTS

WO    WO 9610727 A1 * 4/1996

* cited by examiner

*Primary Examiner*—Tarifur Chowdhury
*Assistant Examiner*—Isiaka O Akanbi
(74) *Attorney, Agent, or Firm*—Greer, Burns & Crain, Ltd.

(57) ABSTRACT

A method of and an apparatus for determining tire shapes are provided which enable both an apparatus weight reduction and a determination accuracy improvement. The apparatus of the present invention includes: a portable base member; a non-contact displacement gage held on the base member so as to be freely movable along a predetermined scanning direction; a weight supported on the base member so as to be movable along the scanning direction; and means for symmetrically driving the displacement gage and weight while synchronizing them with each other. Using this apparatus, the method includes: setting the base member in proximity to a tire tread portion so that the displacement gage will scan the tread portion; allowing the displacement gage and weight to symmetrically move along the scanning direction while synchronizing them with each other; and determining the shape of the tread portion, based on an output from the displacement gage.

12 Claims, 2 Drawing Sheets

METHOD OF AND APPARATUS FOR DETERMINING TIRE SHAPES

BACKGROUND OF THE INVENTION

The present invention relates to a method of and an apparatus for determining tire shapes by using a non-contact displacement gage. More specifically, the present invention relates to a method of and an apparatus for determining tire shapes, which enable both a reduction in the weight of the apparatus and an improvement in determination accuracy.

Hitherto, the shapes and groove depths of the tread portion of a pneumatic tire have been determined by using a non-contact displacement gage, and the determination values have been used as data for analyzing tread wear characteristics of the tire or the like. As an apparatus for determining tire shapes as described above, a portable compact determination apparatus has been proposed in which a displacement gage (probe) scans a tire tread portion (for example, see Japanese Unexamined Patent Publication No. H5-256738).

However, in the portable determination apparatus reduced in weight, the weight of the displacement gage is relatively large. Therefore, when the displacement gage scans a tire tread portion, the position of the center of gravity of the whole determination apparatus shifts, resulting in a tilt of the determination apparatus and a change in the distance between the tread surface and the displacement gage. Accordingly, a problem arises that the determination accuracy is lowered. For this reason, the whole determination apparatus needs to be made heavy while resultantly sacrificing the lightness, or alternatively, a support needs to be provided to fix the determination apparatus. As a result, determination work requires large amounts of effort and time.

SUMMARY OF THE INVENTION

An object of the present invention is to provide a method of and an apparatus for determining tire shapes, which make it possible both to reduce the weight of the apparatus and to improve determination accuracy when tire shapes are determined by using a non-contact displacement gage.

A method of determining tire shapes of the present invention to achieve the above object is a method of determining tire shapes, by using a determination apparatus including: a portable base member; a non-contact displacement gage held on the base member so that the displacement gage can freely move along a predetermined scanning direction; a weight supported on the base member so that the weight can move along the scanning direction; and means for symmetrically driving the displacement gage and the weight while synchronizing the displacement gage and the weight with each other. The method includes the steps of: setting the base member in proximity to a tread portion of a tire so that the displacement gage will scan the tread portion; allowing the displacement gage and the weight to symmetrically move along the scanning direction while synchronizing the displacement gage and the weight with each other; and determining a shape of the tread portion, based on an output from the displacement gage.

By allowing the displacement gage and the weight to move symmetrically along the scanning direction and synchronously with each other, it is possible to prevent the position of the center of gravity of the determination apparatus from shifting when the displacement gage is scanning, and thus to enhance the determination accuracy. Accordingly, when tire shapes are determined by using the non-contact displacement gage, it is possible to achieve both a reduction in the weight of the determination apparatus and an improvement in the determination accuracy. Of course, another displacement gage can be used as the weight.

Moreover, another method of determining tire shapes of the present invention to achieve the aforementioned object is a method of determining tire shapes, by using a determination apparatus including: a portable base member; a pair of non-contact displacement gages held on the base member so that each of the displacement gages can freely move along a predetermined scanning direction; and means for symmetrically driving the pair of displacement gages while synchronizing the pair of displacement gages with each other. The method includes the steps of: setting the base member in proximity to a tread portion of a tire so that the pair of displacement gages will scan the tread portion; allowing the pair of displacement gages to symmetrically move along the scanning direction while synchronizing the pair of displacement gages with each other; and determining a shape of the tread portion, based on outputs from the pair of displacement gages.

By allowing the pair of displacement gages to move symmetrically along the scanning direction and synchronously with each other as described above, it is possible to prevent the position of the center of gravity of the determination apparatus from shifting when the displacement gage is scanning, and thus to enhance the determination accuracy. Accordingly, when tire shapes are determined by using the non-contact displacement gages, it is possible to achieve both a reduction in the weight of the determination apparatus and an improvement in the determination accuracy.

On the other hand, an apparatus for determining tire shapes of the present invention includes: a portable base member; a non-contact displacement gage held on the base member so that the displacement gage can freely move along a predetermined scanning direction; a weight supported on the base member so that the weight can move along the scanning direction; and driving means for symmetrically driving the displacement gage and the weight while synchronizing the displacement gage and the weight with each other.

Here, for the non-contact displacement gage, it is preferable to employ an optical displacement gage including a laser light source and a sensor for receiving laser light reflected from a tire surface. It is preferable that the driving means include a pair of ball screws respectively guiding the displacement gage and the weight along the scanning direction, and a pair of servomotors for respectively rotating the pair of ball screws. The driving means may be configured, including a pair of guide members respectively guiding the displacement gage and the weight along the scanning direction, and a pair of reciprocating drives for respectively allowing the displacement gage and the weight to move along the scanning direction.

Furthermore, another apparatus for determining tire shapes of the present invention includes: a portable base member; a pair of non-contact displacement gages held on the base member so that each of the displacement gages can freely move along a predetermined scanning direction; and driving means for symmetrically driving the pair of displacement gages while synchronizing the pair of displacement gages with each other.

Here, for each of the non-contact displacement gages, it is preferable to employ an optical displacement gage including a laser light source and a sensor for receiving laser light reflected from a tire surface. It is preferable that the driving means include a single ball screw guiding the pair of displacement gages along the scanning direction in opposite directions to each other, and a single servomotor for rotating the ball screw. The driving means may be configured, including a guide member guiding the pair of displacement gages in the scanning direction, and a pair of reciprocating drives for allowing the pair of displacement gages to move along the scanning direction, respectively.

DETAILED DESCRIPTION OF THE PREFERRED EMBODIMENTS

Hereinafter, a configuration of the present invention will be described in detail with reference to the accompanying drawings.

Figure 1:
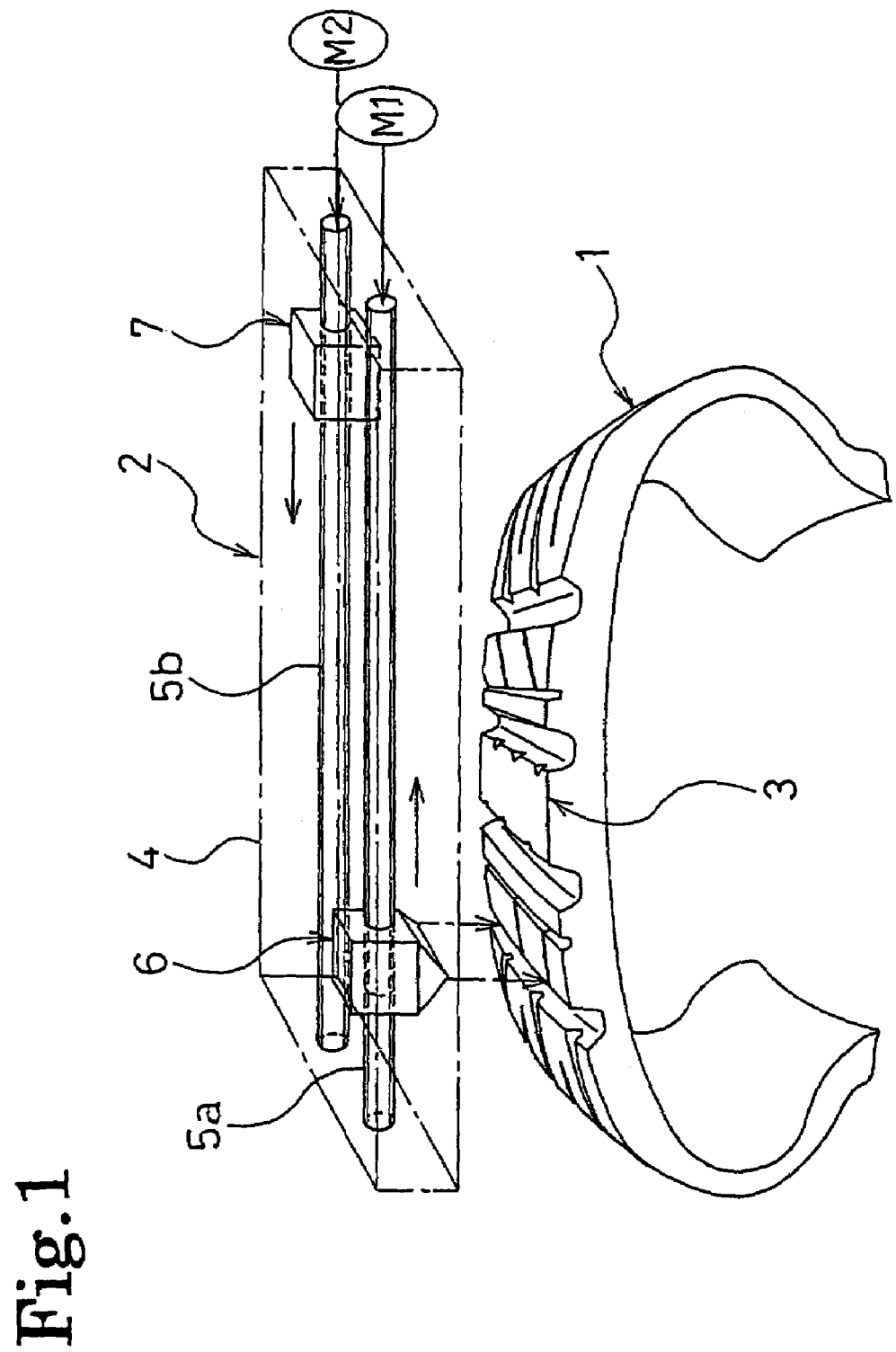
FIG. 1 is a schematic perspective view showing an apparatus for determining tire shapes according to a first embodiment of the present invention.

FIG. 1 shows an apparatus for determining tire shapes according to a first embodiment of the present invention. In FIG. 1, the numeral 1 denotes a tire to be measured, and 2 denotes the portable determination apparatus disposed in proximity to a tread portion 3 of the tire 1.

This determination apparatus 2 has a structure in which two ball screws 5a and 5b are rotatably arranged in parallel with each other in a base member 4 shaped like a box. The ball screw 5a holds an optical displacement gage 6, including a laser light source and a sensor for receiving laser light reflected from a tire surface, so that the optical displacement gage 6 can freely move along a predetermined scanning direction. Meanwhile, the ball screw 5b holds a weight 7, having substantially the same mass as the optical displacement gage 6, so that the weight 7 can freely move along the same scanning direction as that of the optical displacement gage 6. These ball screws 5a and 5b are configured to rotate each in an arbitrary direction, with servomotors M1 and M2, controlled by a control unit, as their power sources, respectively.

Accordingly, by suitably controlling the servomotors M1 and M2, it is possible to allow the optical displacement gage 6 and the weight 7 to move symmetrically and synchronously with each other. That is, the optical displacement gage 6 and the weight 7 are configured to move along the ball screws 5a and 5b, respectively, in opposite directions to each other so that the optical displacement gage 6 and the weight 7 approach or separate each other.

The optical displacement gage 6 projects laser light from the laser light source onto the tire surface, and receives the laser light reflected from the tire surface. Accordingly, it is possible to calculate the distance from the optical displacement gage 6 to the tread portion 3 of the tire 1, based on the reflection time of the laser light.

When the tire shapes are determined by using the above-described determination apparatus 2, first, the base member 4 of the determination apparatus 2 is set in proximity to the tread portion 3 of the tire 1 so that the optical displacement gage 6 will scan the tread portion 3. The optical displacement gage 6 and the weight 7 are allowed to symmetrically move along a scanning direction while being synchronized with each other. For example, the optical displacement gage 6 is allowed to move from one shoulder position to the other shoulder position, while the weight 7 is allowed to move from the other shoulder position to the one shoulder position. Thus, it is possible to determine the shapes and groove depths of the tread portion 3, based on an output from the optical displacement gage 6.

When the optical displacement gage 6 of the determination apparatus 2 is scanning, the optical displacement gage 6 and the weight 7 are moving while maintaining a balance. Therefore, the determination apparatus 2 does not tilt during determination work, allowing its center of gravity to be always stable. Accordingly, it is possible to perform high-accuracy measurement. Consequently, when tire shapes are determined by using the optical displacement gage 6, it is possible to achieve both a reduction in the weight of the determination apparatus and an improvement in determination accuracy.

Note that the means for driving the optical displacement gage 6 and the weight 7 are not limited to the ball screws and the servomotors as described above. For example, the optical displacement gage 6 and the weight 7 may be slidably engaged with guide members, each made of a mere slide rail, and may be allowed to move along a scanning direction with reciprocating drives. Examples of the reciprocating drives include a hydraulic cylinder and the like.

Figure 2:
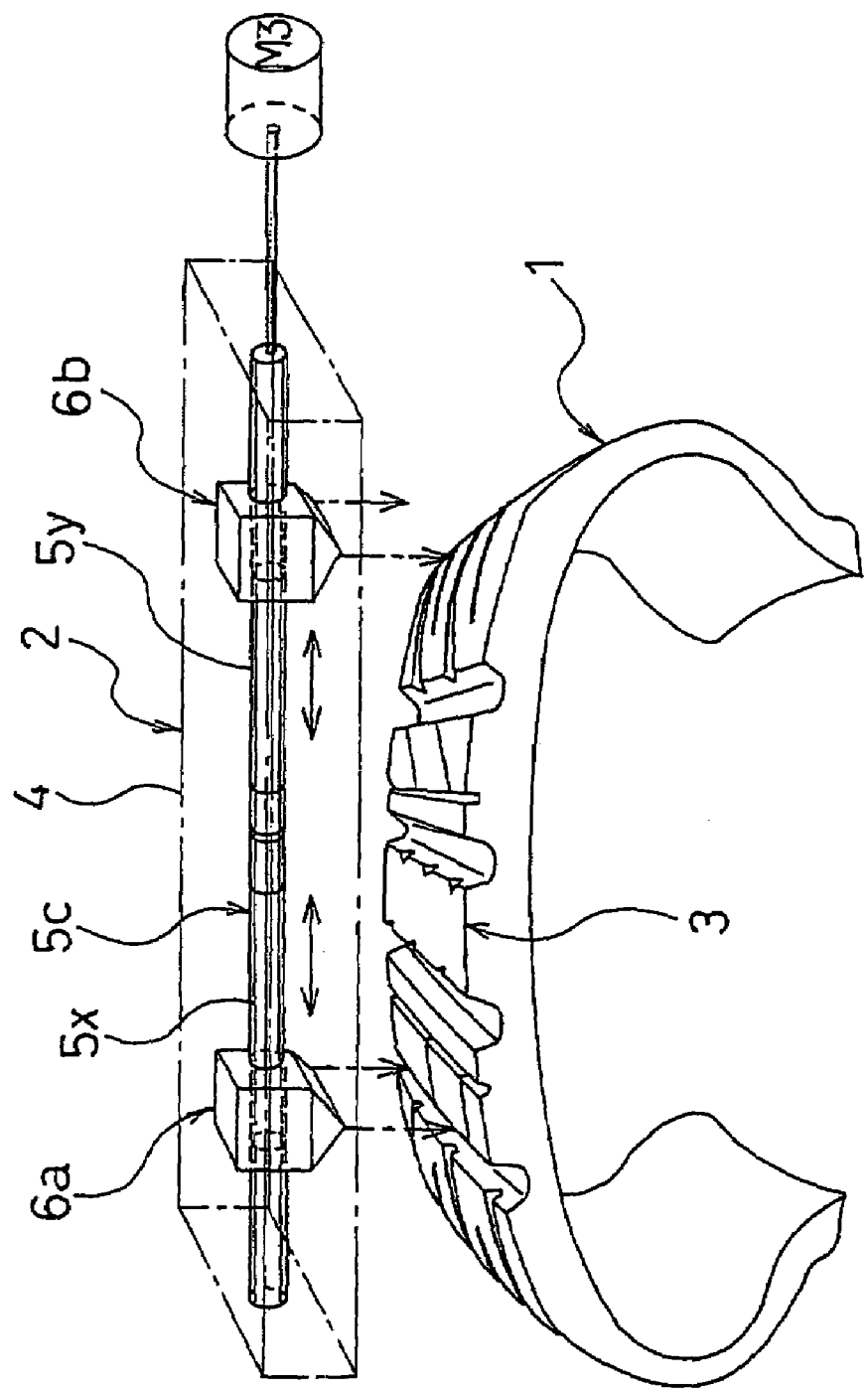
FIG. 2 is a schematic perspective view showing an apparatus for determining tire shapes according to a second embodiment of the present invention.

FIG. 2 shows another apparatus for determining tire shapes according to a second embodiment of the present invention. In FIG. 2, a determination apparatus 2 has a structure in which one ball screw 5c is rotatably arranged in a base member 4 shaped like a box. The ball screw 5c holds a pair of optical displacement gages 6a and 6b so that they can move along a predetermined scanning direction. The optical displacement gages 6a and 6b have substantially the same masses and each include a laser light source and a sensor for receiving laser light reflected from a tire surface. More specifically, screw parts 5x and 5y with different thread directions from each other are formed in the ball screw 5c, bordering a central portion of the ball screw 5c in its longitudinal direction. The optical displacement gage 6a is held within a screw part 5x area, while the optical displacement gage 6b is held within a screw part 5y area. The ball screw 5c is configured to rotate in an arbitrary direction, with a servomotor M3, controlled by a control unit, as its power source.

Accordingly, by suitably controlling the servomotor M3, it is possible to allow the pair of optical displacement gages 6a and 6b to move symmetrically and synchronously with each other. That is, the optical displacement gages 6a and 6b are configured to move along the ball screw 5c in opposite directions to each other so that the optical displacement gages 6a and 6b approach or separate each other.

Each of the optical displacement gages 6a and 6b projects laser light from the laser light source onto the tire surface, and receives the laser light reflected from the tire surface. Accordingly, it is possible to calculate the distance from the optical displacement gage 6a or 6b to the tread portion 3 of the tire 1, based on the reflection time of the laser light.

When the tire shapes are determined by using the above-described determination apparatus 2, first, the base member 4 of the determination apparatus 2 is set in proximity to the tread portion 3 of the tire 1 so that the optical displacement gages 6a and 6b will scan the tread portion 3. The optical displacement gages 6a and 6b are then allowed to symmetrically move along a scanning direction while being synchronized with each other. For example, the optical displacement gage 6a is allowed to move from one shoulder position to a tread center position, while the optical displacement gage 6b is allowed to move from the other shoulder position to the tread center position. Thus, it is possible to determine the shapes and groove depths of the tread portion 3, based on outputs from the optical displacement gages 6a and 6b.

When the optical displacement gages 6a and 6b of the determination apparatus 2 are scanning, the optical displacement gages 6a and 6b are moving while maintaining a balance. Therefore, the apparatus 2 does not tilt during determination work, allowing its center of gravity to be always stable. Accordingly, it is possible to perform high-accuracy measurement. Consequently, when tire shapes are determined by using the optical displacement gages 6a and 6b, it is possible to achieve both a reduction in the weight of the determination apparatus and an improvement in determination accuracy.

The above-described second embodiment is advantageous in terms of weight reduction because the optical displacement gages 6a and 6b are driven by the single ball screw 5c and the single servomotor M3. However, a determination is difficult to make at a central portion of the ball screw 5c because the optical displacement gages 6a and 6b interfere with each other. Nevertheless, such a disadvantage can be easily solved by displacing the determination apparatus 2 in a tire-width direction. Of course, the optical displacement gages 6a and 6b may be held by two ball screws.

Note that the means for driving the optical displacement gages 6a and 6b are not limited to the ball screw and the servomotor as described above. For example, the optical displacement gages 6a and 6b may be slidably engaged with a guide member made of a mere slide rail, and may be allowed to move along a scanning direction with reciprocating drives. The reciprocating drives include a hydraulic cylinder and the like.

According to the present invention, the determination apparatus does not tilt when scanning the optical displacement gage. Therefore, the center of gravity of the determination apparatus is always stable, and high-accuracy measurement can be performed. Accordingly, when tire shapes are determined by using a non-contact displacement gage, it is possible both to reduce the weight of the determination apparatus and to improve determination accuracy. In addition, the determination apparatus of the present invention is portable, and furthermore, it is not necessary to fix the apparatus itself on a support. Therefore, it is possible to efficiently carry out the work for determination of tire shapes.

Hereinbefore, the preferred embodiments of the present invention have been described in detail. However, it should be understood that various changes, substitutions and replacements may be made in the above-described embodiments without departing from the spirit and scope of the present invention as defined by the appended claims.

What is claimed is:

1. A method of determining tire shapes, by using a determination apparatus including: a portable base member; a non-contact displacement gage held on the base member so that the displacement gage can freely move along a predetermined scanning direction; a weight supported on the base member so that the weight can move along the scanning direction; and means for symmetrically driving the displacement gage and the weight while synchronizing the displacement gage and the weight with each other, the method comprising the steps of:

setting the base member in proximity to a tread portion of a tire so that the displacement gage will scan the tread portion;

allowing the displacement gage and the weight to symmetrically move back and forth along the scanning direction in opposite directions while synchronizing the displacement gage and the weight with each other; and determining a shape of the tread portion, based on an output from the displacement gage.

2. The method of determining tire shapes according to claim 1, wherein the non-contact displacement gage is an optical displacement gage including a laser light source and a sensor for receiving laser light reflected from a surface of the tire.

3. A method of determining tire shapes, by using a determination apparatus including: a portable base member; a pair of non-contact displacement gages held on the base member so that each of the displacement gages can freely move along a predetermined scanning direction; and means for symmetrically driving the pair of displacement gages while synchronizing the pair of displacement gages with each other, the method comprising the steps of:

setting the base member in proximity to a tread portion of a tire so that the pair of displacement gages will scan the tread portion;

allowing the pair of displacement gages to symmetrically move back and forth along the scanning direction in opposite directions while synchronizing the pair of displacement gages with each other; and determining a shape of the tread portion, based on outputs from the pair of displacement gages.

4. The method of determining tire shapes according to claim 3, wherein each of the non-contact displacement gages is an optical displacement gage including a laser light source and a sensor for receiving laser light reflected from a surface of the tire.

5. An apparatus for determining tire shapes, comprising:
a portable base member;
a non-contact displacement gage held on the base member so that the displacement gage can freely move along a predetermined scanning direction;
a weight supported on the base member so that the weight can move back and forth along the scanning direction; and
driving means for symmetrically driving the displacement gage and the weight back and forth in opposite directions while synchronizing the displacement gage and the weight with each other.

6. The apparatus for determining tire shapes according to claim 5, wherein the non-contact displacement gage is an optical displacement gage including a laser light source and a sensor for receiving laser light reflected from a tire surface.

7. The apparatus for determining tire shapes according to claim 5, wherein the driving means includes: a pair of ball screws respectively guiding the displacement gage and the weight along the scanning direction; and a pair of servomotors for respectively rotating the pair of ball screws.

8. The apparatus for determining tire shapes according to claim 5, wherein the driving means includes: a pair of guide members respectively guiding the displacement gage and the weight along the scanning direction; and a pair of reciprocating drives for respectively allowing the displacement gage and the weight to move along the scanning direction.

9. An apparatus for determining tire shapes, comprising:
a portable base member;
a pair of non-contact displacement gages held on the base member so that each of the displacement gages can freely move along a predetermined scanning direction; and driving means for symmetrically driving the pair of displacement gages back and forth in opposite directions while synchronizing the pair of displacement gages with each other.

10. The apparatus for determining tire shapes according to claim 9, wherein each of the non-contact displacement gages is an optical displacement gage including a laser light source and a sensor for receiving laser light reflected from a tire surface.

11. The apparatus for determining tire shapes according to claim 9, wherein the driving means includes: a single ball screw guiding the pair of displacement gages along the scanning direction in opposite directions to each other; and a single servomotor for rotating the ball screw.

12. The apparatus for determining tire shapes according to claim 9, wherein the driving means includes: a guide member guiding the pair of displacement gages along the scanning direction; and a pair of reciprocating drives for respectively allowing the pair of displacement gages to move along the scanning direction.

* * * * *